(12) United States Patent
Lafont

(10) Patent No.: US 8,348,621 B2
(45) Date of Patent: Jan. 8, 2013

(54) VANE FOR AIRCRAFT TURBINE ENGINE RECEIVER, PROVIDED WITH TWO HOLLOW CORES LODGED IN ONE ANOTHER

(75) Inventor: Laurent Lafont, Pechbusque (FR)

(73) Assignee: Airbus Operations SAS, Toulouse (FR)

( * ) Notice: Subject to any disclaimer, the term of this patent is extended or adjusted under 35 U.S.C. 154(b) by 443 days.

(21) Appl. No.: 12/705,229

(22) Filed: Feb. 12, 2010

(65) Prior Publication Data

US 2010/0209254 A1 Aug. 19, 2010

(30) Foreign Application Priority Data

Feb. 17, 2009 (FR) ...................................... 09 51017

(51) Int. Cl.
*B64C 27/46* (2006.01)
(52) U.S. Cl. ..................... 416/226; 416/229 R; 416/233; 416/239
(58) Field of Classification Search .................. 416/226, 416/229 R, 232, 233, 238, 239; 244/123.1, 244/123.3, 123.14
See application file for complete search history.

(56) References Cited

U.S. PATENT DOCUMENTS

| 4,022,546 | A |   | 5/1977 | Drees et al. |         |
|-----------|---|---|--------|--------------|---------|
| 4,083,656 | A |   | 4/1978 | Braswell et al. |      |
| 4,329,119 | A |   | 5/1982 | Baskin       |         |
| 4,494,910 | A | * | 1/1985 | Hahn et al.  | 416/226 |
| 4,806,077 | A | * | 2/1989 | Bost         | 416/226 |

FOREIGN PATENT DOCUMENTS

| EP | 0 062 737 A1 | 10/1982 |
| EP | 0 863 073 A2 | 9/1998 |
| EP | 0 863 073 A3 | 9/1998 |

* cited by examiner

*Primary Examiner* — Edward Look
*Assistant Examiner* — Maxime Adjagbe
(74) *Attorney, Agent, or Firm* — Oblon, Spivak, McClelland, Maier & Neustadt, L.L.P.

(57) ABSTRACT

The invention relates to a vane (200) for an aircraft turbine engine receiver. The vane is a blade (14) having an aerodynamic shell (24) enveloping a principal hollow structure core (34) extending in the direction of wingspan of the blade. The vane further has a secondary structural assembly (34') enveloped by the hollow core (34) and extending also in the direction of wingspan, as well as a first coating made of shock-absorbing material (50) arranged between a longeron (44) of the core (34) and the assembly (34'), and a second coating made of shocking-absorbing material (52) arranged between another longeron (38) of the core (34) and this same assembly (34').

10 Claims, 4 Drawing Sheets

VANE FOR AIRCRAFT TURBINE ENGINE RECEIVER, PROVIDED WITH TWO HOLLOW CORES LODGED IN ONE ANOTHER

TECHNICAL FIELD

The present invention relates in general to receiver vanes of an aircraft turbine engine. It applies in particular to turbojets, propjet engines and turbine engines known as "open rotor".

PRIOR ART

In reference to FIG. 1, this illustrates part of a turbine engine receiver of open rotor type, this receiver corresponding to a helix 1 equipped with a plurality of vanes 2. By way of indication, such a turbine engine is known to comprise two contrarotating helices, the first being solid in rotation with a first free power turbine, and the second helix being solid in rotation with a second free power turbine, arranged downstream from the first.

FIG. 2 shows one of the vanes 2 of the helix, intended to be mounted to rotate on a hub of the latter, this hub assisting in delimiting airflow 6. To achieve this, the vane 2 comprises a foot 8 mounted in rotation on the hub 4 according to an axis 10, for example by means of a ball-bearing system 12. In this way and by means of an appropriate variable setting system (not shown) cooperating successfully with the vane 2, the latter can be pivoted permanently during operation of the turbine engine, as a function of the preferred incidence.

The foot 8 extends radially towards the exterior as far as the level of the airflow 6. Also, the vane comprises a blade part 14 situated in the airflow, a mechanical junction 18 of reduced cross-section connecting it to the foot 8. In this respect, as shown in FIG. 2, this junction 18 can form an integral part of a piece forming a tulip 20, the head 22 of which is lodged within the blade part 14, and whereof the rod of the tulip is constituted by this junction 18 of reduced cross-section. Also, the tulip 20 can be made from a single piece with the foot 8, for example of composite material, preferably comprising a mixture of glass fibres and/or carbon with resin.

With respect to the blade part 14, it has an aerodynamic shell 24 forming the intrados 30 and the extrados 32 of the blade between the leading edge 26 and the trailing edge 28. This shell is also preferably made from a single piece, for example of composite material, preferably comprising a mixture of glass fibres and/or carbon with resin.

The shell 24 envelops a hollow structural core 34 extending in the direction of wingspan of the blade, located in the external radial continuity of the tulip head 22 to which it is attached by a casing 36. The core 34 usually extends over a very wide proportion of the blade part in the direction of the wingspan, for example over more than 80%.

In reference to FIG. 3, it is evident that the core 34, making up the structural part of the blade part, has a transversal cross-section in the general form of a square, constituted by means of a first longeron 38 oriented towards a leading edge 26, but remaining at a distance from the latter, a second longeron 40 oriented towards a trailing edge 28, but remaining at a distance from the latter, a third longeron 42 oriented towards the intrados 30 and a fourth longeron 44 oriented towards the extrados 32.

As is evident in FIG. 3, in conventional terms, the third longeron 42 is placed in contact with the intrados 30 of the shell, and the fourth longeron 44 is placed in contact with the extrados 32 of this same shell 34. The elements in contact can be fixed in pairs, for example by adhesion or copolymerisation.

If this widespread technical solution ensures acceptable rigidity for the vanes, especially due to the hollow structural core forming a caisson, it still can be perfected, especially in its capacity to resist shocks, for example those caused by a flying object, on the ground or in flight.

OBJECT OF THE INVENTION

The aim of the invention therefore is to propose a vane which at least partially remedies the drawbacks mentioned hereinabove, relative to the embodiments of the prior art.

To achieve this, the object of the invention is a vane for an aircraft turbine engine receiver comprising a blade part having an aerodynamic shell forming the intrados and the extrados of the blade, said shell enveloping a principal hollow structural core extending in the direction of wingspan of the blade and formed by means of a first longeron oriented towards a leading edge of the shell, a second longeron oriented towards a trailing edge of the shell, a third longeron oriented towards the intrados and a fourth longeron oriented towards the extrados. According to the invention, the vane further comprises a secondary structural assembly enveloped by said principal hollow structural core and likewise extending in the direction of wingspan of the blade, as well as a first coating made of shock-absorbing material arranged between the fourth longeron and said secondary structural assembly, and a second coating made of shock-absorbing material arranged between said first longeron and this same assembly.

Due to the presence of the secondary structural assembly, available to duplication of the hollow structural core of the vane, the latter retains its integrity even after having undergone projectile shock. In fact, shocks occurring on the vane in flight or on the ground, for example caused by a flying object or any other projectile, for the most part occur between the leading edge and a rear part of the extrados. Consequently, in the case of such a shock occurring in this prime impact zone, the projectile colliding with the aerodynamic shell initially stresses the principal core, then crushes one of the two coatings according to the present invention. During this preferred crushing, part of the impact energy of the flying object and of the shockwave is absorbed, such that only residual energy is transmitted to the secondary structural assembly. The shock resistance of the vane is accordingly greatly improved, without the overall mass of the vane as such being affected.

If the principal core breaks after substantial intensity impact, then the secondary structural assembly, less stressed during the shock due to its placement inside the hollow core and its protection by the coatings, can ensure on its own the structural function of the vane, at least during a predetermined period.

As a consequence, this secondary structural assembly essentially fulfils a security function, known as "Fail Safe", intended to counter any possible degradation of the principal core in the event of projectile shock.

Said secondary structural assembly preferably at least partially forms a secondary hollow structural core.

According to a preferred embodiment of the present invention, said structural assembly fully forms said secondary hollow structural core by means of a first longeron oriented towards a leading edge of the shell, a second longeron oriented towards a trailing edge of the shell, a third longeron oriented towards the intrados and a fourth longeron oriented towards the extrados. In this case, said principal and secondary cores are arranged in contact with one another, at the level of their second and third longerons.

It is noted that said structural assembly alternatively forms only part of said secondary hollow structural core, the other part being preferably formed by elements common to the principal core.

Said shock-absorbing material is preferably foam, for example metallic foam of porosity greater than 80%, or material with a honeycomb structure, or even absorbent gel, for example of silicone type.

According to another preferred embodiment of the present invention, the vane also comprises a coating made of shock-absorbing material arranged on said fourth longeron of the principal core, externally to the latter, as well as a coating made of shock-absorbing material arranged on said first longeron of the principal core, externally to the latter.

Coatings made of shock-absorbing material interposed between the aerodynamic shell and the two longerons of the principal core considered as most exposed to shock are provided here. As mentioned hereinabove, the prime projectile shock zone on the vane is located between the leading edge and a rear part of the extrados. As a consequence, in the case of such a shock occurring in this prime impact zone, the projectile colliding with the aerodynamic shell starts to crush one or more of these shock-absorbing coatings. During this desired crushing, part of the impact energy of the flying object and of the shockwave is absorbed, such that only residual energy is transmitted to the principal hollow structural core of the vane. The shock resistance of the vane is greatly improved, without the overall mass of the vane as such being affected.

Said hollow principal core and said secondary structural assembly are each preferably made in a single piece, preferably of composite material, for example comprising a mixture of glass fibres and/or carbon with resin.

Said hollow principal core and said secondary structural assembly are preferably rigidly interconnected by means of joining elements spaced apart from one another in the direction of the wingspan of the blade. Overall, this limits the extent of losses on the principal core in the event of projectile shock, this extent becoming effectively limited to the radial length between two directly consecutive joining elements, or even possibly to the radial length between three directly consecutive joining elements when projectile impact takes place opposite one of these joining elements.

Another aim of the invention is an aircraft turbine engine comprising a receiver equipped with a plurality of vanes, such as that described hereinabove.

The turbine engine is preferably a turbojet, a propjet engine, or an "open rotor". So, in the case of the turbojet, these are vanes of the fan, whereas in the two following cases, these are vanes of helices.

Finally, the aim of the invention is an aircraft comprising a plurality of turbine engines, such as that mentioned hereinabove.

Others advantages and characteristics of the invention will emerge in the detailed non-limiting description hereinbelow.

BRIEF DESCRIPTION OF THE DRAWINGS

This description will be given with respect to the attached diagrams, in which.

DETAILED DESCRIPTION OF PREFERRED EMBODIMENTS

Figure 1:
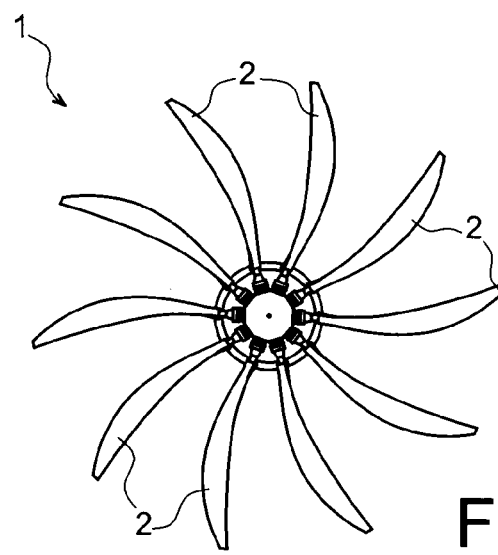
FIG. 1, already described, illustrates a partial frontal view of a helix known from the prior art, this schematic view also applicable for the present invention.
Figure 4:
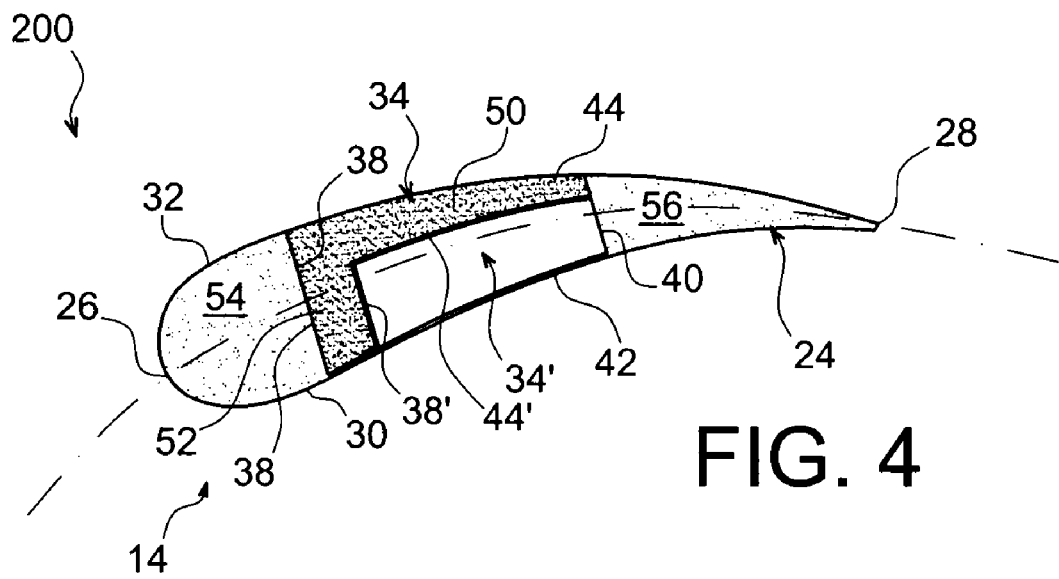
FIG. 4 illustrates a view similar to that of FIG. 3, with the vane being in the form of a first preferred embodiment of the present invention.

In reference to FIG. 4, this shows a vane 200 for equipping a turbine engine helix of "open rotor" type, in which two contrarotating helices are respectively set in rotation by two free turbines. This type of helix is shown in FIG. 1, applicable to the present invention.

Figure 2:
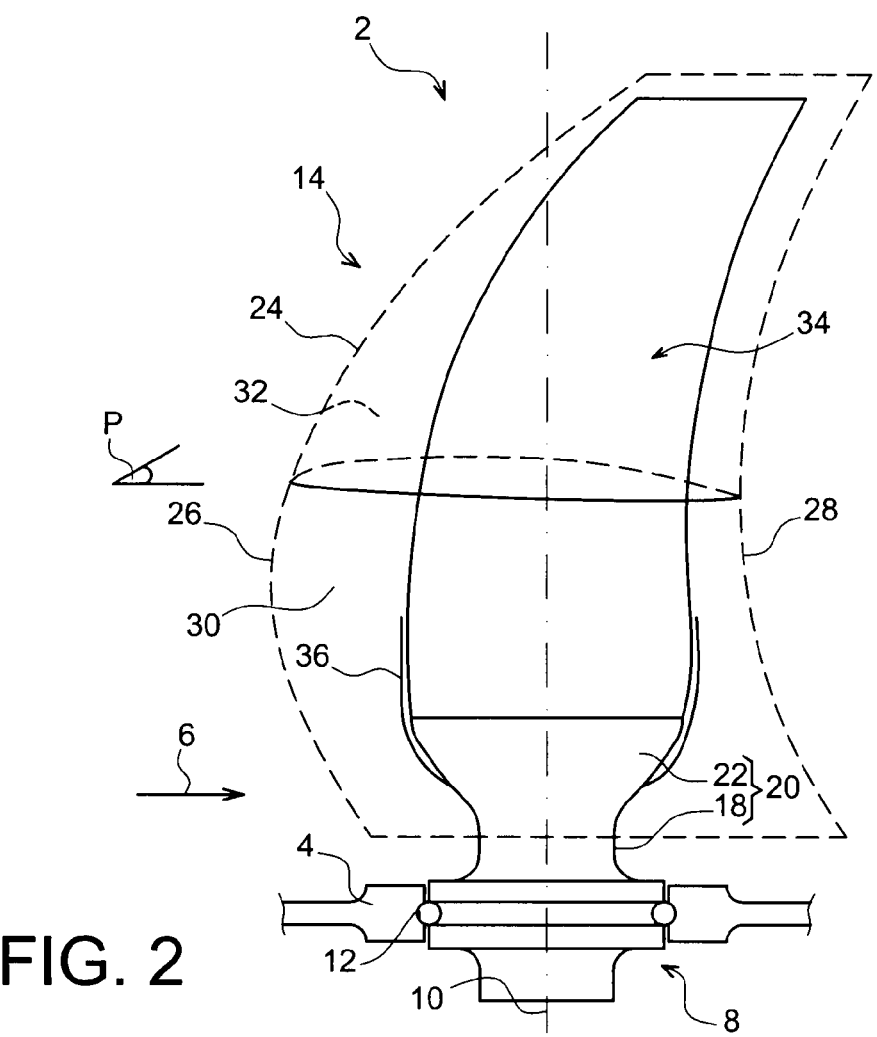
FIG. 2, already described, illustrates a schematic view of one of the vanes of the helix of FIG. 1, according to the prior art.
Figure 3:
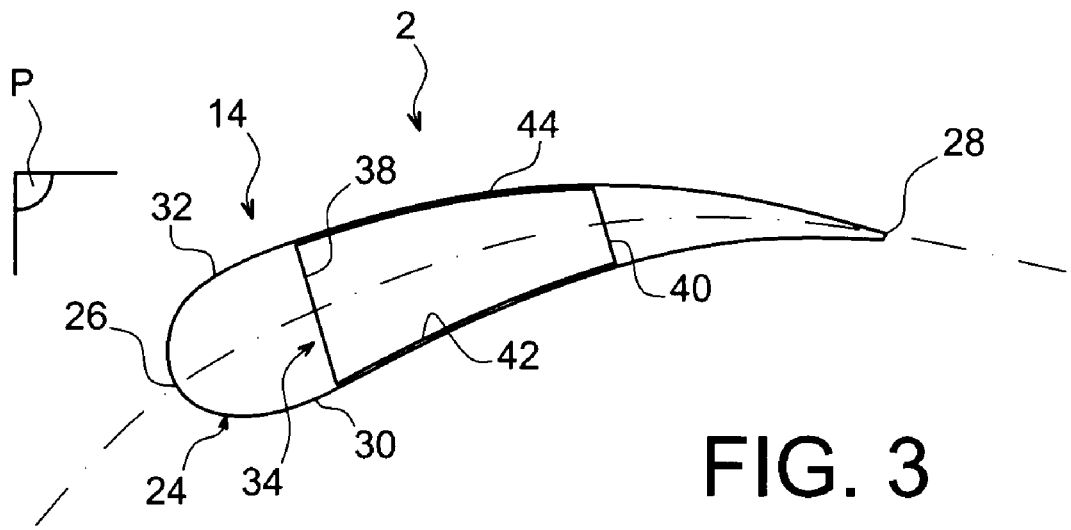
FIG. 3 illustrates a view in transversal section of the vane shown in FIG. 2, taken according to the plane P of this same figure.

The vane 200, corresponding to a first preferred embodiment of the invention, has similarities with the vane described in reference to FIGS. 2 and 3. In this respect, the elements bearing the same reference numbers correspond to identical or similar elements. Also, it is noted that only changes in blade part 14 are made, the foot and the tulip described in reference to FIG. 2 being preferably retained here.

FIG. 4 illustrates that the core 34 is retained and constitutes the principal hollow structural core of the vane according to the invention. Arranged inside the latter is a secondary structural assembly 34' which comprises a longeron 44' opposite and at a distance from the longeron 44 of the principal core, as well as a longeron 38' solid with the longeron 44' and situated opposite and at a distance from the longeron 38 of the principal core.

The longeron 44' extends down as far as the longeron 40 of the principal core, just as the longeron 38' extends towards the intrados as far as the longeron 42 of this core. Rigid links can connect these longerons in pairs. As a consequence, the assembly 34' participates in formation of a secondary hollow structural core, also of transversal cross-section in a general square shape, constituted by means of the longerons 38' and 44', as well as by means of a downstream part of the third longeron 42 and a part of the second longeron 40 located near the intrados 30. In other terms, in this preferred embodiment of the invention the above parts of the longerons 40 and 42 are common to the two cores 34, 34'.

Also, a first coating made of shock-absorbing material 50 is applied to the longeron 44', extending in the direction of wingspan of the blade, over at least a portion of the length of this longeron 44'. This shock-absorbing coating 50 preferably fully covers the longeron 44', and fully fills in the space between the latter and the fourth longeron 44 of the principal core.

Similarly, a second coating made of shock-absorbing material 52 is applied to the longeron 38', also externally to the core 34', extending in the direction of wingspan of the blade, over at least a portion of the length of this longeron 38'. This shock-absorbing coating 52 preferably fully covers the longeron 38', and fully fills in the space between the latter and the first longeron 38 of the principal core.

These two shock-absorbing coatings 50, 52, preferably made of foam of PMI (polymethacrylimide) type, for example those marketed under the registered trade mark Rohacell, preferably have substantially constant thicknesses. They can be made in a single piece, jointly forming an L in transversal cross-section, such as that shown in FIG. 4. This L therefore joins the longerons 38, 44 of the principal core 34 and the longerons 38', 44' of the inner secondary core 34'. In addition, as is evident in FIG. 4, the L filling in the space between the two cores 34, 34' is arranged opposite the intrados 30, with its base oriented towards the leading edge 26 and its upper branch joining the extrados 32.

The secondary core 34', also in the form of a caisson extending in the direction of wingspan, fulfils a security role in the event of degradation of the principal core 34, that is, a "Fail Safe" function. In other terms, it creates duplication of this principal core, over a length substantially equal to that of the latter. As a consequence, the two cores 34, 34' each extend within the blade part 14 similarly to that described in reference to FIG. 2, specifically over a very wide proportion of the part 14 in the direction of the wingspan.

The core 34 and the secondary assembly 34' can each be made equally in a single piece, or by means of the longerons mounted fixed on one another, for example made of composite material, preferably comprising a mixture of glass fibres and/or carbon with resin.

It is noted that filler material 54, of any type, can fill in the space between the longeron 38 and the front part of the aerodynamic shell 24, just as filler material 56 can fill in the space between the longeron 40 of the core 34 forming the caisson, and the rear part of the aerodynamic shell 24.

The hollow secondary core 34' in the form of a caisson can optionally also be filled with any filler material.

Figure 5:
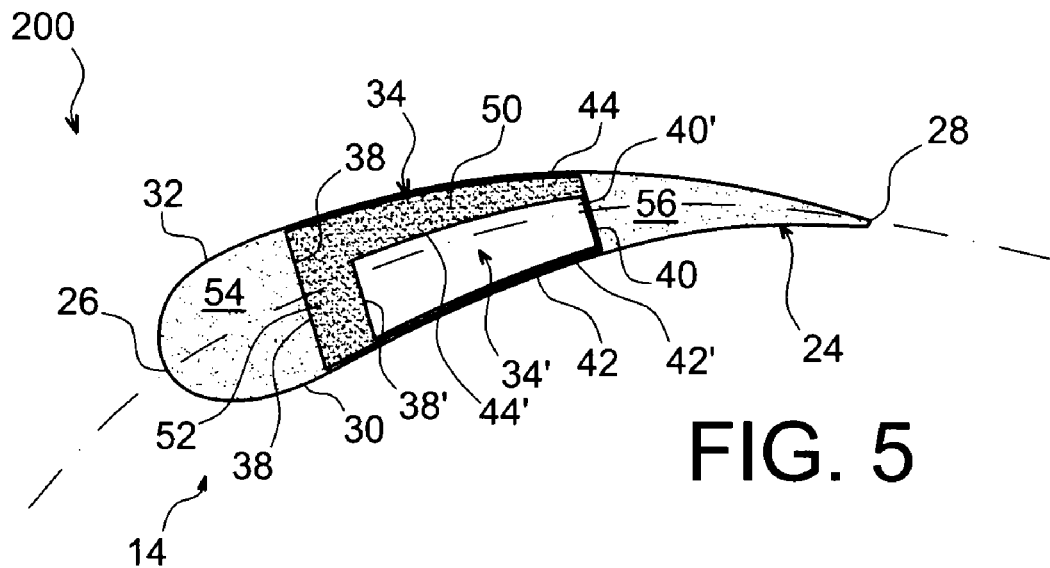
FIG. 5 illustrates a view similar to that of FIG. 4, with the vane being in the form of a second preferred embodiment of the present invention.

In the second preferred embodiment of the invention shown in FIG. 5, the secondary structural assembly 34' fully forms the secondary core. For this to happen, the assembly 34' comprises not only the longerons 38', 44' of the first preferred embodiment, but also a longeron 40' flat against the second longeron 40 of the principal core, as well as a longeron 42' flat against the third longeron 42 of the principal core, these longerons preferably being attached in pairs.

This concerns veritable duplication of the principal core 34, made inside the latter.

Figure 6:
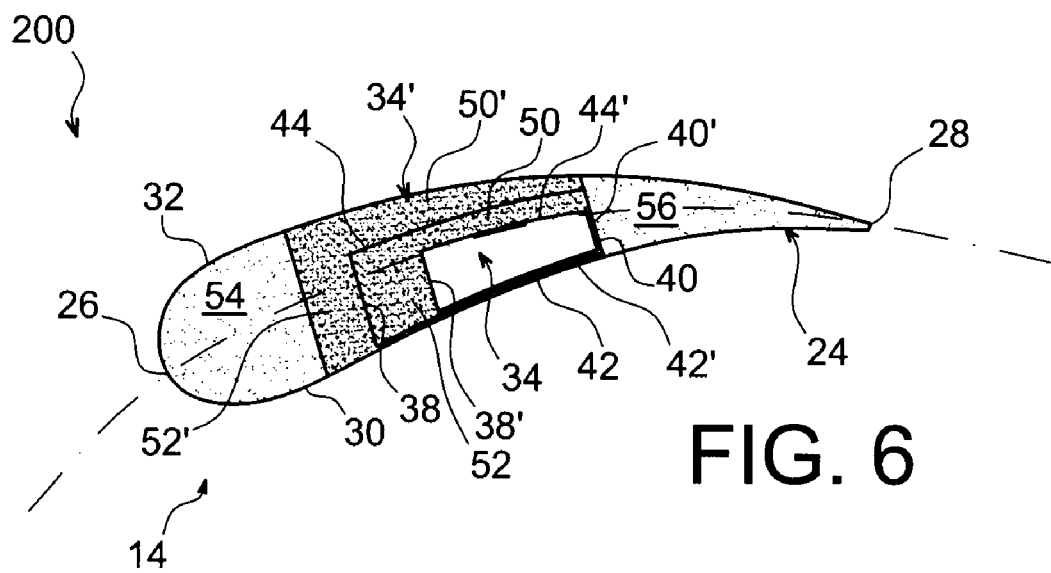
FIG. 6 illustrates a view similar to that of FIG. 5, with the vane being in the form of a third preferred embodiment of the present invention.

In the third embodiment shown in FIG. 6, coatings made of shock-absorbing material have been added to reinforce resistance of the vane to projectile impacts. If this third mode is described with a configuration in which the assembly 34' fully forms the secondary core, it is also applicable to any other configuration, in particular that of the first mode wherein the two cores 34, 34' comprise common elements.

In this third preferred embodiment, only the third longeron 42 of the hollow structural core 34 remains in contact with the aerodynamic shell 24, and more precisely with its part forming the intrados 30. In fact, in this preferred embodiment, a first coating made of shock-absorbing material 50' is applied to the fourth longeron 44 of the core, extending, in the direction of wingspan of the blade, over at least a portion of the length of this longeron 44. This shock-absorbing coating 50' preferably fully covers the longeron 44, and fully fills in the space between the latter and the extrados 32.

Similarly, a second coating made of shock-absorbing material 52' is applied to the first longeron 38, also externally to the core 34, extending in the direction of wingspan of the blade, over at least a portion of the length of this longeron 38. This shock-absorbing coating 52 preferably fully covers the longeron 38, remaining at a distance from the leading edge 26.

These two shock-absorbing coatings 50', 52', preferably made of PMI (polymethacrylimide) type foam, for example those marketed under the registered trade mark Rohacell, preferably have substantially constant thicknesses. They can be made in a single piece, jointly forming an L in transversal cross-section, such as is shown in FIG. 6. This L therefore joins the longerons 38, 44 of the core 34, by being arranged opposite the intrados 30, with its base oriented towards the leading edge 26 and its upper branch joining the extrados 32.

Here, too, filler material 54 can fill in the space between the shock-absorbing coating 52 and the front part of the aerodynamic shell 24, just as filler material 56 can fill in the space between the longeron 40 of the principal core 34 forming the caisson, and the rear part of the aerodynamic shell 24.

Figure 7:
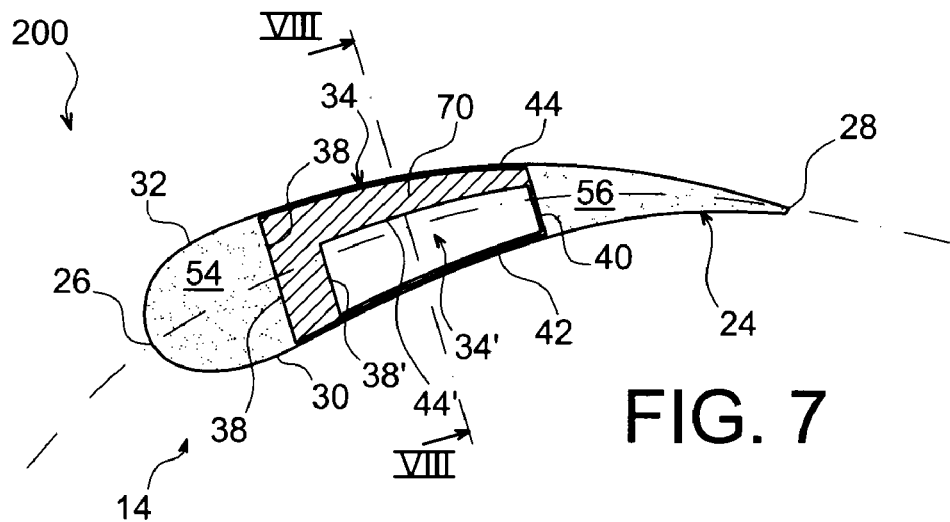
FIG. 7 illustrates a view similar to that of FIG. 5, with the vane being in the form of a fourth preferred embodiment of the present invention, this view corresponding to a view in section taken along the line VII-VII of FIG. 8.
Figure 8:
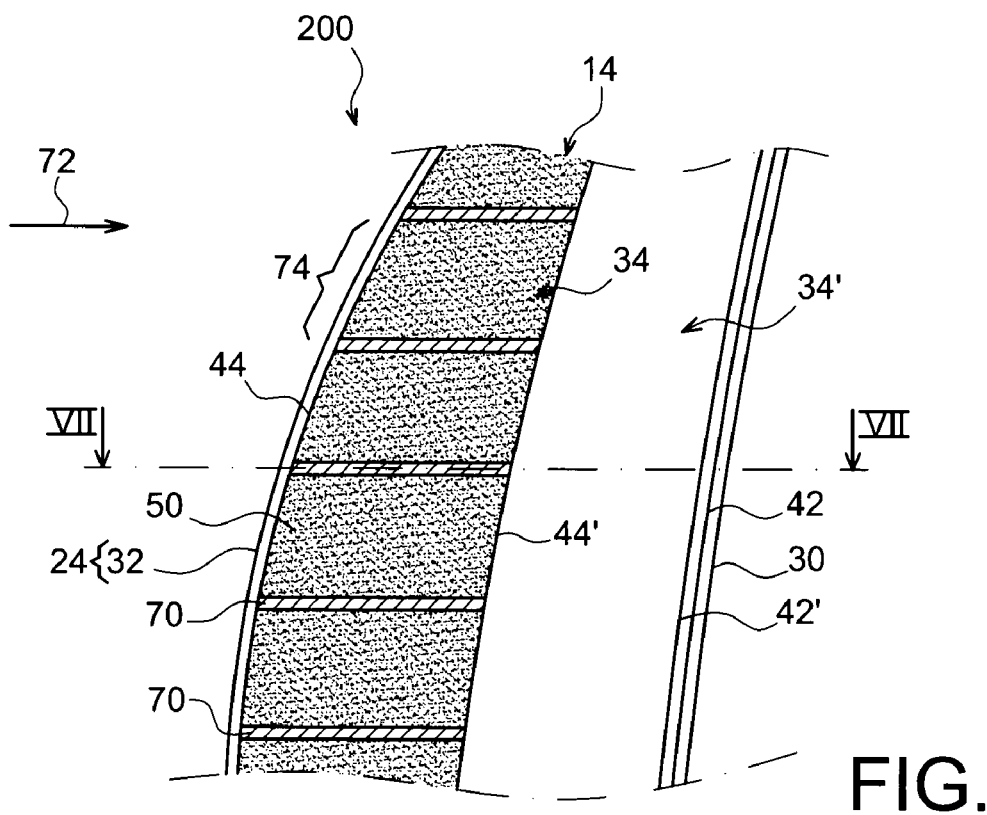
FIG. 8 illustrates a view in section taken along the line VIII-VIII of FIG. 7.

FIGS. 7 and 8 show a fourth preferred embodiment of the present invention. Its specificity, applicable to each of the configuration shown in the preceding figures, consists of providing a plurality of joining elements 70 rigidly connecting the two cores 34, 34'. These joining elements are spaced apart from one another in the direction of the wingspan, as shown in FIG. 8. Each element 70 preferably takes the form of a plate oriented substantially orthogonally to the direction of the wingspan. The plate adopts a form similar to that of the L made of shock-absorbing material described hereinabove, since in its plane it fully fills in the space between the two cores 34, 34'.

Rigid links are preferably provided between the plates 70 and the longerons 38, 44, 38', 44' defining the inter-core space. In this respect, it is noted that in this preferred embodiment the inter-core space is filled in by these same plates, as well as by the coatings 50, 52 filling in the inter-plate spaces in the direction of the wingspan, available to the radial direction.

Adding these plates 70 limits the extent of losses on the principal core 34 in the event of projectile shock, such as that illustrated schematically by the arrow 72 of FIG. 8. In such a case, the extent of the loss of the principal core 34 is effectively limited to the radial length 74 between the two plates 70 located on either side of the point of impact of the projectile, since the radially upper and radially lower portions of this core 34 remain held at the blade by these plates 70.

It is understood that various modifications can be made by the person skilled in the art to the invention which has just been described, solely by way of non-limiting examples.

The invention claimed is:

1. A vane for an aircraft turbine engine receiver comprising a blade part having an aerodynamic shell forming the intrados and the extrados of the blade, said shell enveloping a principal hollow structural core extending in the direction of wingspan of the blade and formed by means of a first longeron oriented towards a leading edge of the shell, a second longeron oriented towards a trailing edge of the shell, a third longeron oriented towards the intrados and a fourth longeron oriented towards the extrados, characterised in that it further comprises a secondary structural assembly enveloped by said principal hollow structural core and extending also in the direction of wingspan of the blade, as well as a first coating made of shock-absorbing material arranged between the fourth longeron and said secondary structural assembly, and a second coating made of shock-absorbing material arranged between said first longeron and this same assembly.

2. The vane as claimed in claim 1, characterised in that said secondary structural assembly at least partially forms a secondary hollow structural core.

3. The vane as claimed in claim 2, characterised in that said structural assembly fully forms said secondary hollow structural core by means of a first longeron oriented towards the leading edge of the shell, a second longeron oriented towards a trailing edge of the shell, a third longeron oriented towards the intrados and a fourth longeron oriented towards the extrados.

4. The vane as claimed in claim 3, characterised in that said principal and secondary cores are arranged in contact with one another, at the level of their second and third longerons.

5. The vane as claimed in claim 1, characterised in that said shock-absorbing material is foam, or a material with a honeycomb structure.

6. The vane as claimed in claim 1, characterised in that it comprises also a coating made of shock-absorbing material arranged on said fourth longeron of the principal core, externally to the latter, as well as a coating made of shock-absorbing material arranged on said first longeron of the principal core, externally to the latter.

7. The vane as claimed in claim 1, characterised in that said hollow principal core and said secondary structural assembly are each made in a single piece, preferably of composite material.

8. A turbine engine for an aircraft comprising a receiver equipped with a plurality of vanes as claimed in claim 1.

9. The turbine engine as claimed in claim 8, characterised in that it is a turbojet, a propjet engine, or an open-rotor.

10. An aircraft comprising a plurality of turbine engines as claimed in any one of claims 8 and 9.

* * * * *